United States Patent [19] [11] 3,717,223
Alfes [45] Feb. 20, 1973

[54] ENERGY ABSORBER

[75] Inventor: John A. Alfes, Drayton Plains, Mich.

[73] Assignee: General Motors Corporation, Detroit, Mich.

[22] Filed: Sept. 20, 1971

[21] Appl. No.: 182,004

[52] U.S. Cl. .................. 188/1 C, 293/1, 293/DIG. 3, 213/1 A
[51] Int. Cl. ........................ B60r 19/04, F16d 63/00
[58] Field of Search .......... 188/1 C; 213/1 A; 293/1, 293/DIG. 3, 70, 89

[56] References Cited

UNITED STATES PATENTS

| 3,412,628 | 11/1968 | DeGain | 74/492 |
| 3,462,191 | 8/1969 | Erneman et al. | 188/1 C |
| 3,519,301 | 7/1970 | Somnitz | 293/1 |

Primary Examiner—Drayton E. Hoffman
Assistant Examiner—Robert Saifer
Attorney—W. E. Finken et al.

[57] ABSTRACT

An energy absorber useful for automobile vehicle bumpers of the like includes a first energy absorbing element adapted to buckle under compressive load, a second element adapted to unfold under tensile load, and an impact distributing member adapted to simultaneously compressively load the first element and tensilely load the second element on the application of impact force.

4 Claims, 6 Drawing Figures

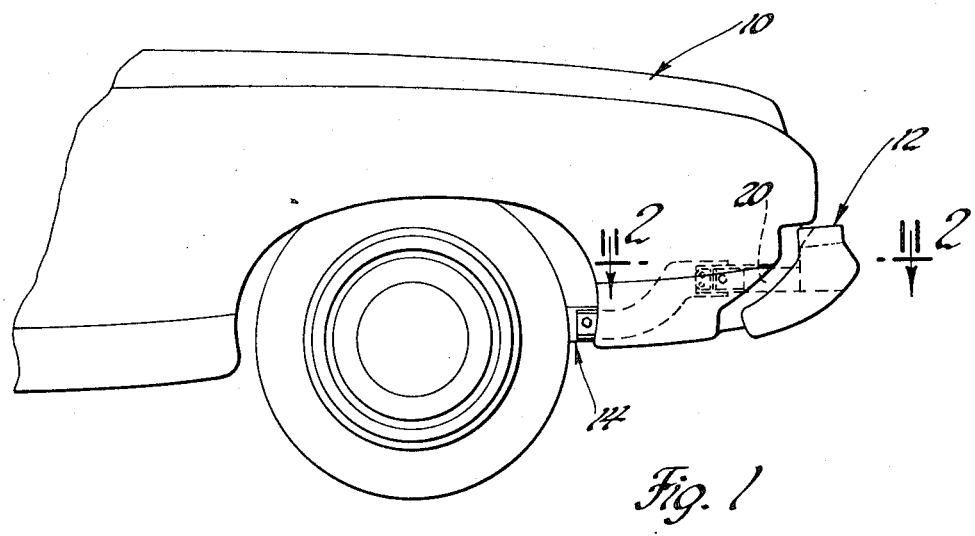
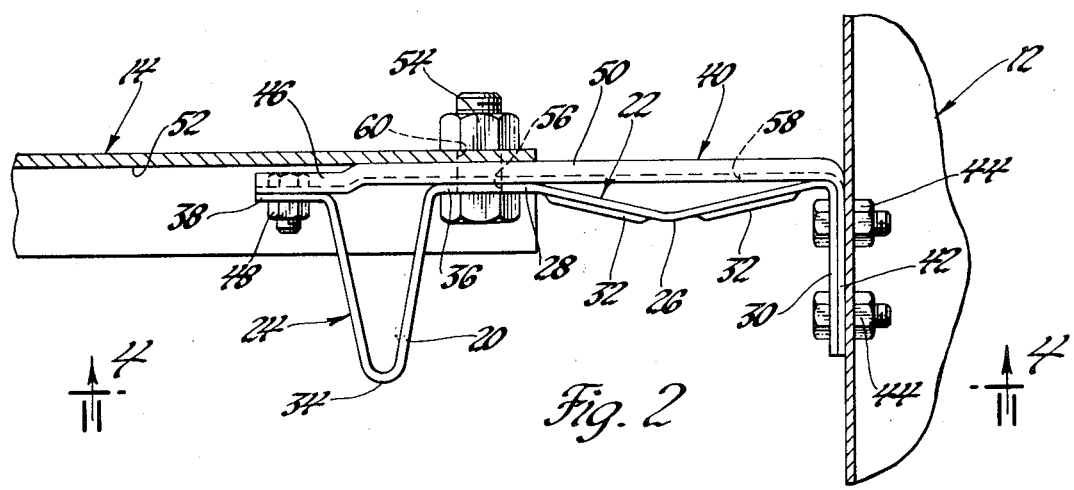
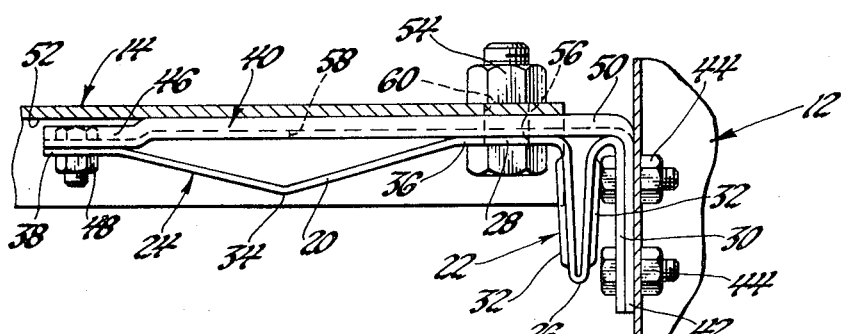

ENERGY ABSORBER

This invention relates to energy absorbers and more particularly to an improved energy absorber for automotive vehicle bumper systems and the like.

One feature of the present invention is that it provides an improved energy absorber wherein a first buckleable column type of energy absorbing element is utilized in conjunction with a second convoluted unfoldable type of energy absorbing element arranged between an impact receiving member, as for example, a bumper on a vehicle body, and a body to be protected such that the two elements operate simultaneously to add the buckling load or resistance of the first element and the unfolding resistance of the second element to provide a total resistance to movement of the impact receiving member.

A further feature of this invention is that, in the case of ductile material energy absorbing elements subject to irreversible plastic deformation, the characteristic load-displacement performance of the buckling element obtained over a range of such buckling, decreasing from an initially high value, is added to the characteristic load-displacement performance of the unfolding element, which rises from an initially low value, to provide a load-displacement performance having a substantially constant value or load over the range of displacement of the impact receiving member.

A further feature of the invention is in the provision of such buckling and unfolding elements integrally in an energy absorbing member carried by an impact distributing member mounted between the impact receiving member and the body to be protected such that movement of the impact receiving and impact distributing members simultaneously buckles and unfolds the buckling and unfolding elements.

These and other features and advantages of the invention will be readily apparent from the following specification and from the drawings in which:

FIG. 1 is a partial elevational view of an automotive vehicle body including an energy absorber according to this invention;

FIG. 2 is a sectional view taken generally along the plane indicated by the line 2—2 of FIG. 1 showing the energy absorber in the normal condition;

FIG. 3 is a view similar to FIG. 2 showing the energy absorber in a collapsed condition;

Figure 4:
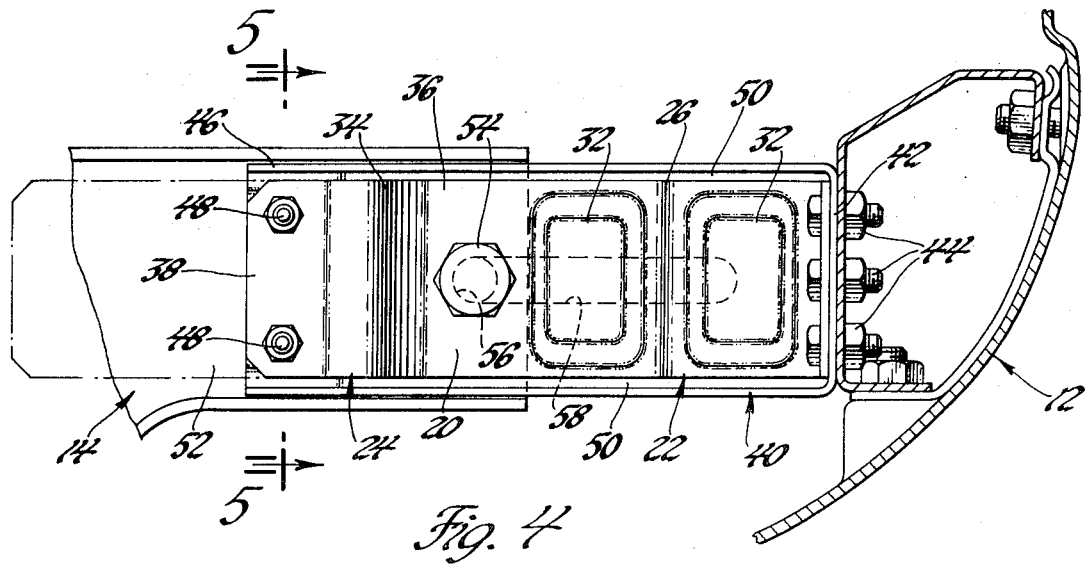
FIG. 4 is a sectional view taken generally along the plane indicated by the line 4—4 of FIG. 2.

Referring now particularly to FIG. 1 of the drawings, an energy absorber according to this invention is shown incorporated within an energy absorbing bumper assembly for the vehicle, although it will be understood that straightforward applications of the energy absorber may readily be made to diverse other uses from that specifically discussed hereinbelow. In the case of the automotive vehicle bumper assembly, the energy absorber is incorporated between the vehicle body 10, impact damage to which is to be minimized, and the usual impact receiving face or bumper bar 12 extending transversely across the front of the vehicle body. For best protection, the energy absorber is mounted between the bumper bar and the forward portions of the rigid vehicle frame or a rigid extension thereof as indicated in the drawings at 14.

Referring to FIG. 2, the energy absorber comprises an elongated bar or strap 20 forming a first energy absorbing element 22 and a second energy absorbing element 24. In this preferred embodiment of the invention, the two elements are formed integrally within the strap 20. It will, however, be appreciated as this description proceeds that the two elements may be formed separately. Element 22 operates as a folding element having a normal configuration wherein the midportion 26 of the element is slightly laterally offset from the end portions 28 and 30 thereof so that the element takes a shallow V-shape in plan view. Stiffening ribs 32 increase the strength of the legs of the element between the midportion and the end portions so that bending will be generally localized to such mid and end portions. The element 22 is intended to act basically as a compressively loaded column under impact forces applied thereto such that when a predetermined load is experienced in the element, buckling will occur in well-known manner to force midportion 26 laterally outwardly causing the element to fold into succeedingly deeper V-shape configurations, the deepest of which is shown generally in FIG. 3. As is known from experience with buckling of column elements, the predetermined load at which incipient buckling occurs is typically the highest load experienced by the element throughout its buckling range, such load usually falling off slowly and to decreasing values as the moment arm of force application between the mid and end portions increases. This load vs. deflection characteristic is illustrated as curve $a$ in FIG. 6, the highest or incipient buckling load being shown at $a_1$.

The element 24 operates as an unfolding element subject to tensile load so as to be deformed from a normal convoluted condition, FIG. 2, to a straightened condition illustrated in FIG. 3. In normal condition, the unfolding element 24 is provided with a midportion 34 having a large lateral offset from the two end portions thereof 36 and 38 so that the element takes a deep V-shape configuration. In operation, the element is adapted under tensile load to gradually extend or deform into at least a shallow V-shape configuration, ultimately nearly flat or straightened as indicated in FIG. 3. As is typical with tensile load applied to such members the resistance or load experienced in the element during such force deflection varies from a low initial load to successively higher values as the moment arm of force application between the mid and end portions 34, 36, 38 decreases. A characteristic load-deflection curve for such an element is illustrated at curve $b$ in FIG. 6 wherein it is seen that the load varies from an initially low value $b_1$ to progressively higher values.

According to a feature of the present invention, the folding and unfolding elements 22 and 24 are caused to operate in unison; i.e., the elements are caused to begin their deformation or deflection substantially simultaneously and to buckle and unfold substantially simultaneously over the range of movement of bumper 12 relative to body 10 so that their individual resistance or loads add and provide a desired total load or resistance for energy absorber strap 20. By virtue of the initially high but decreasing load characteristic of element 22 and the initially low but increasing characteristic of element 24, the two elements may be tailored to provide a cumulative load over the range of displacement which will remain substantially constant as illustrated in curve $c$ in FIG. 6. The benefits to be derived from such a constant load in the absorber include the fact that the resisting object, in this case vehicle body 10, will be subjected only to a predetermined load at a level safe for its structure and no higher, yet that load will be maintained and not diminish throughout the deflection of the energy absorber thereby resulting in maximum energy input to the absorber, i.e., a maximum area underneath curve $c$.

As mentioned, it will be readily understood that elements 22 and 24 may be incorporated between bumper 12 and body 10 to operate simultaneously but be formed as separate members. In a preferred form, however, the elements are formed integrally in strap 20; for example, end portions 28 and 36 are integrally connected. In such preferred form, simultaneous deformation may be accomplished by an impact distributing member 40. This member is of generally L-shaped configuration including a leg 42 for attachment to the rear face of bumper bar 12. Bolt and nut assemblies 44 serve for such connection as well as for fixed mounting of the end portion 30 of element 22 to leg 42 and to the bumper bar, aligned apertures being provided in all those members for the reception of the bolts.

Figure 5:
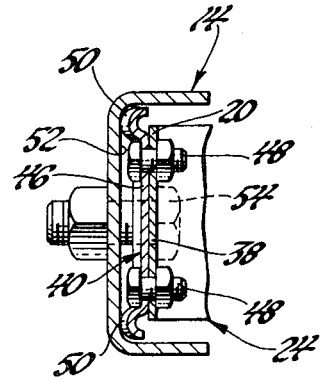
FIG. 5 is a sectional view taken generally along the plane indicated by the line 5—5 of FIG. 4.

Adjacent its other end, the impact distributing member is provided with an offset bolt clearance portion 46 at which is mounted end portion 38 of element 24 by a bolt and nut assembly 48. As seen best in cross section in FIG. 5, impact distributing member 40 is formed with rounded longitudinally extending ribs 50 which form bearing surfaces juxtaposed to a flat lateral surface 52 of the frame extension 14. These surfaces may be lubricated or left dry to accomplish a desired frictional engagement between the impact distributing member and the extension. Such engagement is accomplished by a further bolt and nut assembly 54 the bolt of which is received through an aperture 56 in the juncture portion of strap 20 which joins the end portions 28 and 36, through an elongated slot 58 in the impact receiving member, best viewed in FIG. 4, and finally through an aperture 60 in the extension 14 aligned with aperture 56. In the condition of the parts shown in FIGS. 2 and 4, one end of slot 58 is engaged with the bolt of assembly 54. Bolt and nut assembly 54 thus may be tightened for desired frictional engagement between the extension and member 40 and, regardless of the degree of tightening, serves to constrain the end portions 36 and 28 in a fixed location on the frame of body 10 during energy dissipating displacement of the energy absorber strap 20.

Figure 6:
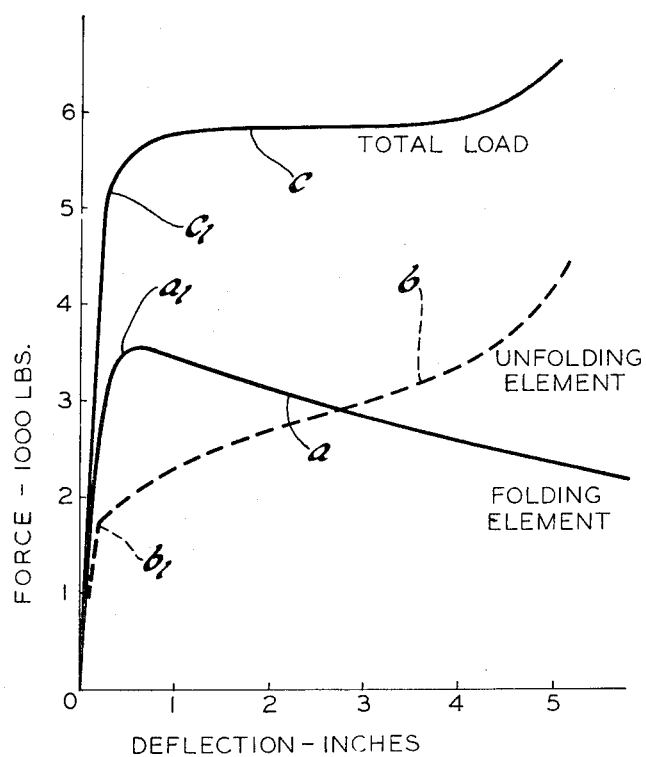
FIG. 6 is a graph showing characteristic load-displacement curves for the energy absorber.

Specifically, when an impact force is applied to bumper 12 of a magnitude reaching the value $c_1$ in FIG. 6, incipient buckling or folding of element 22 is caused simultaneously with incipient unfolding of element 24. As indicated above, load $c_1$ may or may not represent some substantial frictional load between member 40 and extension 14 which will remain substantially constant. The respective folding and unfolding deflections of the elements proceed as described above each in accordance with their respective curves $a$ and $b$ of FIG. 6 until a final collapsed condition, for example the ultimate condition of FIG. 3, wherein the other end of slot 58 engages the bolt of assembly 54, is reached. The deflections occur, of course, by virtue of the compressive force between end portion 30 on the bumper bar moving relative to the end portion 28, which is constrained in fixed position on body 10, and simultaneously the tensile force caused by end portion 38 of element 24 moving with the impact distributing member 40 relative to constrained end portion 36. A total kinetic energy input on bumper 12 is thus gradually absorbed by the simultaneously deforming elements 22 and 24 up to their maximum deflected condition of FIG. 3.

The foregoing description and illustrations of the drawings generally convey the operation of an energy absorber strap 20 constructed of a mild steel or similar material in which the elements 22 and 24 undergo primarily irreversible plastic deformation. Involved in the performance characteristics of such an absorber, as indicated by FIG. 6, are of course factors of specific material strength, thickness of strap 20 and the exact configuration of the elements 22 and 24. In this latter respect, the amount of lateral offset of midportions 26 and 34 in their normal condition largely contributes to their incipient deformation loadings. It should be observed that similar results may be accomplished with elastic and elastomeric materials and even with materials such as spring steel wherein less plastic or irreversible deformation occurs. In this case, large amounts of potential energy may be retained in the strap 20 following collapse of the position in FIG. 3 so that the energy absorber will automatically restore itself to an extended position.

Having thus described the invention, what is claimed is:

1. An energy absorber for dissipating the energy of force moving an impact receiving member relative to a body comprising, a first elongated energy absorbing element formed in a substantially flat unfolded configuration such that predetermined compressive load applied to the ends of said element induces buckling thereof causing said element to fold, a second energy absorbing element formed in a folded configuration such that a predetermined tensile load applied to the ends of said element causes it to unfold, and means mounting said elements between said impact receiving member and said body such that impact force moving said impact receiving member relative to the body is distributed to simultaneously effect compressive load in said first element and tensile load in said second element causing said elements to simultaneously fold and unfold respectively.

2. An energy absorber for dissipating the energy of impact forces moving an impact receiving member relative to a body comprising, a first energy absorbing column element having generally straight configuration in normal condition and subject to a predetermined compressive force applied to the end portions thereof to undergo buckling and to establish therein a load varying from an initially high value to gradually decreasing values during such buckling, a second energy absorbing element having convoluted configuration in normal condition and subject to tensile forces applied to the end portions thereof to undergo straightening and to establish therein a load varying from an initially low value to gradually higher values during such straightening, and means mounting said elements between the impact receiving member and the body such that impact force moving such energy absorbing member relative to the body is distributed to simultaneously effect compressive loading in said first element and tensile loading in said second element whereby said elements simultaneously buckle and straighten respectively and cumulatively resist said movement of said impact receiving member with generally constant load over a range of such movement.

3. An energy absorber for dissipating the energy of forces moving an impact receiving member relative to a body comprising an elongated energy absorbing member constructed of ductile material and including a first substantially flat energy absorbing element laterally offset midway the length thereof from the end portions thereof whereby predetermined compressive load applied to such end portions induces buckling of said first element causing said element to fold, said member further including a second energy absorbing element integral with said first element and formed in a folded configuration such that a predetermined tensile load applied to the end portion of said second element causes such element to unfold, and means mounting said member between said impact receiving member and said body such that impact forces moving said impact receiving member relative to the body is distributed to simultaneously effect compressive load in said first element and tensile load in said second element causing said portions to simultaneously fold and unfold respectively.

4. An energy absorber for dissipating the energy of forces moving an impact receiving member relative to a body comprising, an elongated energy absorbing member constructed of ductile material and including at one end thereof a first substantially flat energy absorbing element formed with a shallow V in normal condition whereby a predetermined compressive load applied to the end portions of such element induces buckling thereof causing said element to further fold into a deeper such shape, said energy absorbing member further including at the opposite end thereof a second energy absorbing element formed in a folded configuration in normal condition such that a predetermined tensile load applied to the end portion of such element causes unfolding movement thereof, an impact distributing member, means connecting said impact distributing member with said impact receiving member, means mounting one end portion of said first energy absorbing element remote from said second element to said impact receiving member and mounting one end portion of said second element remote from said first element to said impact receiving member, and means connecting the adjacent other end portions of said first and second elements to said body and slidably mounting said impact receiving member on said body whereby an impact force moving said impact receiving member relative to said body moves said impact distributing member in a manner to simultaneously load said first element in compression and said second element in tension whereby said elements simultaneously fold and unfold.

* * * * *